Figure 1:
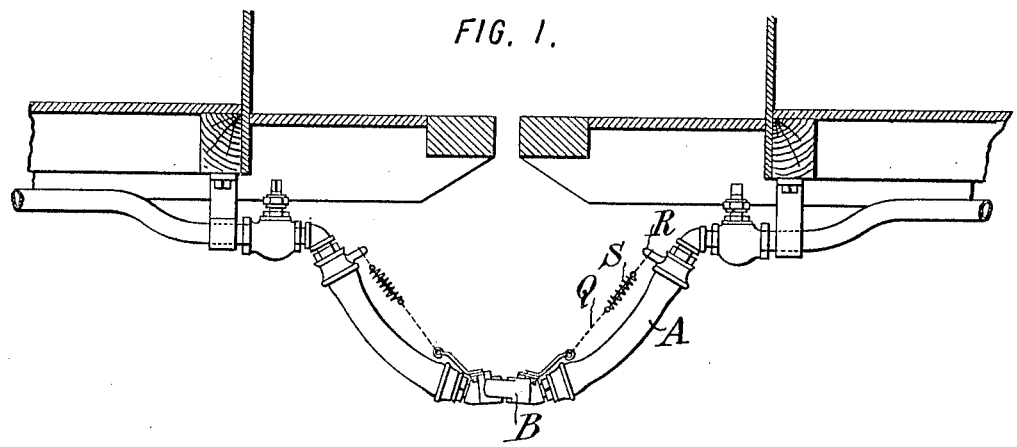

E. E. GOLD.
COUPLING.
APPLICATION FILED JULY 6, 1908.

947,487.

Patented Jan. 25, 1910.
2 SHEETS—SHEET 1.

WITNESSES:
Fred White
René Muine

INVENTOR:
Edward E. Gold,
By Attorneys,

E. E. GOLD.
COUPLING.
APPLICATION FILED JULY 6, 1908.
947,487.
Patented Jan. 25, 1910.
2 SHEETS—SHEET 2.
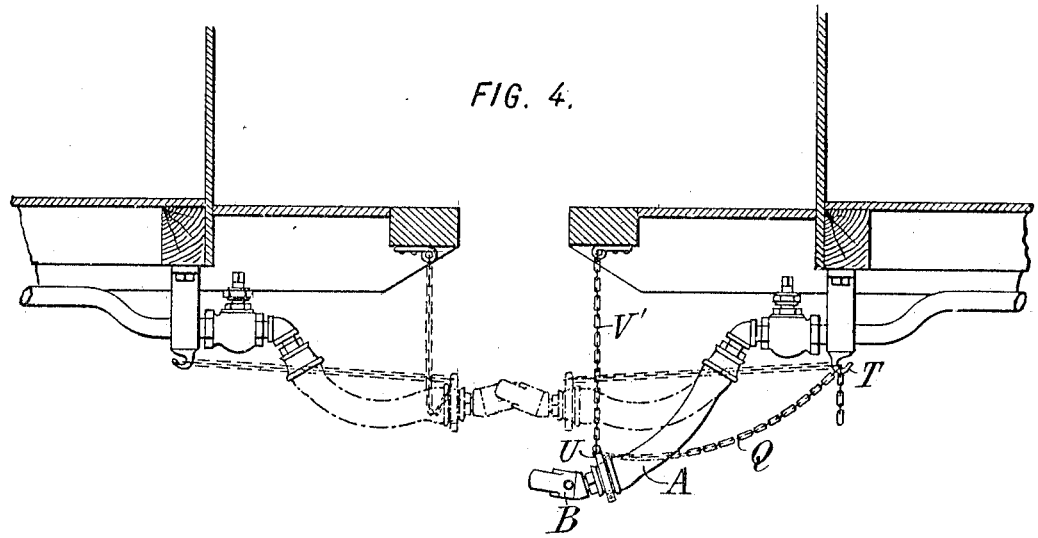
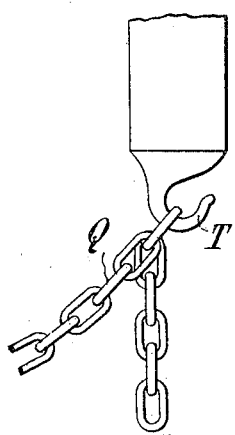
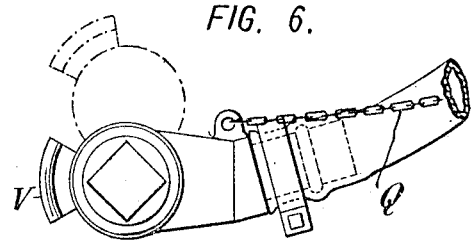
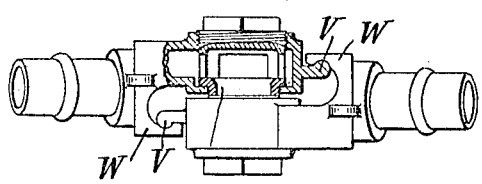
WITNESSES:
Fred White
René Bruine
INVENTOR:
Edward E. Gold,
By Attorneys

UNITED STATES PATENT OFFICE.

EDWARD E. GOLD, OF NEW YORK, N. Y.

COUPLING.

947,487.  Specification of Letters Patent.  Patented Jan. 25, 1910.

Application filed July 6, 1908. Serial No. 442,242.

*To all whom it may concern:*

Be it known that I, EDWARD E. GOLD, a citizen of the United States, residing in the borough of Manhattan, city, county, and State of New York, have invented certain new and useful Improvements in Couplings, of which the following is a specification.

This invention aims to provide certain improvements in couplings especially adapted for use in connection with hose couplers such as are used for connecting flexible hose of train pipes carrying steam for heating, or air for the brakes, or other fluid. These couplers depend from the ends of flexible hose lengths and are arranged to inter-couple with each other by lifting them and pressing them against each other in angular positions and allowing them to drop to approximately parallel horizontal positions, certain locking flanges coming into play as they swing down from the upwardly inclined to the approximately horizontal position. In uncoupling it is only necessary to lift the couplers, at the same time inclining their outer ends upward until the hooks or flanges become disengaged. These couplers uncouple automatically when the cars pull apart, the couplers being ordinarily set in the ends of the hose at such angles that when the hose is lifted and drawn taut by the separation of two cars, the ends of the couplers swing upward to the uncoupling position. This automatic uncoupling, however, involves a certain strain upon the hose to not only lift the weight of the couplers, which is sometimes great, but also in the case of air brake couplers to pull them apart after they are lifted. In the usual type of air brake couplers, the two couplers are locked together by a yielding or impositive lock, which presses the laterally exposed gaskets of the two couplers together. In uncoupling in the manner described, the final pulling of the couplers apart is only effected by the yielding of the gaskets to permit the impositive locking surfaces to pass one over the other. There is thus involved a severe strain upon the gaskets in this automatic uncoupling operation. The damage done by the strain on the hose is also apt to be greater in the case of the air brake couplers than in the case of steam pipe couplers. The alternate stretching and releasing of the hose induces a degree of porosity which occasionally allows so much air to escape as to accidentally set the brakes, the difficulty having been frequently experienced with freight trains, where it does the more damage.

The present invention aims to partly or entirely relieve the strain which comes upon the hose in this automatic uncoupling, by substituting a chain or equivalent connection in such a way as to itself take a part or all of the strain when the cars draw apart without the couplers having been separated by hand. It will be understood that the railroads have rules requiring trainmen to separate couplers by hand before separating any two cars, but the violations of this rule are so frequent that the difficulties above referred to often occur.

The invention aims also to provide improvements in the means for locking couplers together, and also other improvements in detail which are referred to hereinafter.

The accompanying drawings illustrate embodiments of the invention.

Figure 2:
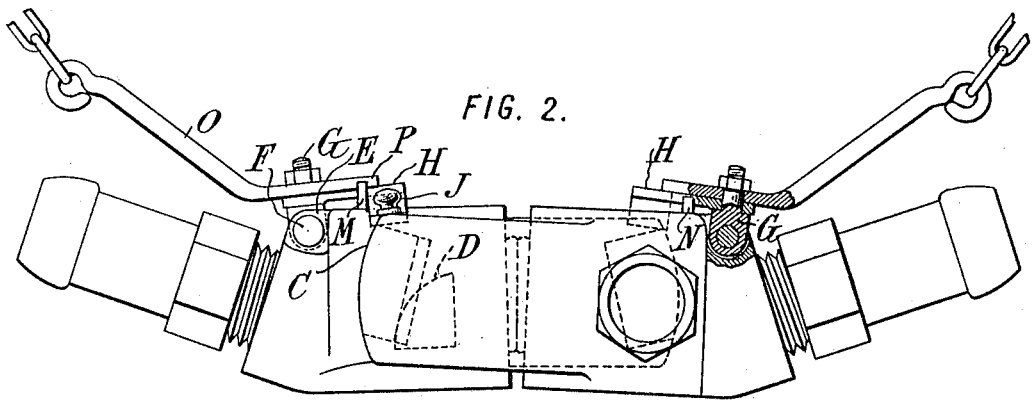
Figure 3:
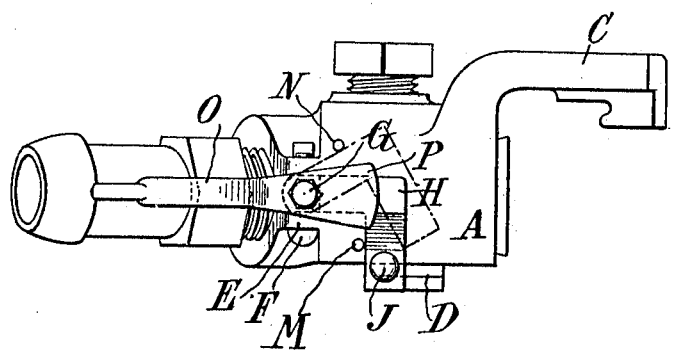

Figure 1 is an elevation of the train pipe and coupled hose with two adjacent cars; Fig. 2 is a similar elevation of a pair of couplers in the coupled position, one of them being partly in section; Fig. 3 is a plan of one of the couplers of Fig. 2; Fig. 4 is an elevation similar to Fig. 1, of another construction; Fig. 5 is an enlarged detail. Fig. 6 is an elevation showing the invention applied to a coupler of the air brake type, and Fig. 7 is a plan of a pair of the same couplers partly in section.

The mechanism shown in Figs. 1, 2 and 3 is designed to relieve the hose of part of the strain, but not necessarily of all the strain, and is designed also to be used in connection with (or without if preferred) an additional positive lock. Where the possibility of automatic uncoupling is contemplated, the positive lock of course will not be operated when the couplers are coupled. The mechanism of Fig. 4 is arranged to relieve the hose entirely of the strain of automatic uncoupling.

Referring to the embodiment of the invention shown in Figs. 1, 2 and 3, the hose A carries on its lower end a coupler B of any usual or suitable type adapted to intercouple with the coupler on the adjacent car by hooking an arm C over a flanged projection D on the mating coupler. Each coupler has a pair of lugs E on the upper part of its neck, between which runs a horizontal pin F forming the pivot of a stud G, upon the upper end of which is pivoted an L-shaped arm H preferably provided with a handle J and having its outer portion adapted to extend over the side of the coupler so as to overlie the arm C of the mating coupler, as shown at the left in Fig. 2, and to lock this arm down in the coupled position. The pivotal movement of the locking member H may be limited by a pair of studs M and N on the top of the coupler. For holding the locking member H in either its locked or its unlocked position, and for providing at the same time means for reducing the strain on the hose in automatic uncoupling, I provide a lever O, pivoted also on the stud G and having its lower end P overlying the locking member H; and I exert a constant upward pull upon the rear member of the lever O so as to press the forward member P and the locking member H down on the top of the coupler with a sufficient frictional force to prevent accidental movement of the locking member. The pull on the arm O is preferably effected by means of a chain Q fastened to the rear end of the lever and running up to a suitable point of attachment. A convenient point is a lug R on the sleeve of the upper end of the hose. With this position of attachment of the upper end of the chain, it is clear that in an automatic uncoupling operation as the hose A tends to straighten out, there is also a tendency to shorten the chain. A spring S, however, is preferably interposed in the chain so as to take up the difference in length occasioned under the conditions stated, and to still exert some pulling strain upon the couplers, and to that extent relieve the hose. In the lowered coupled position the chain is at such an angle with respect to the longitudinal axis of the couplers as to exert comparatively little uncoupling effect. But as soon as the uncoupling action commences, the pull of the chain becomes more and more nearly at right angles to the longitudinal axis of the coupler, consequently its pulling effect upon the coupler is greater.

Where the chain is to relieve the hose entirely of the uncoupling strain, it is preferably fastened at a lower or more rearwardly point than in Fig. 1. Such a point is indicated in Fig. 4, being a lug or preferably a hook T on the under side of the bracket which supports the train-pipe a sufficient distance in the rear of the hose A. The chain in this case will not need a spring, although a spring may be provided if preferred so as to give a yielding operation. Preferably however some means are provided for adjusting the chain so that it shall be slack, but as nearly straight as possible without exerting any strain upon the couplers, in the running locked position. For this purpose the attachment T is provided in the form of a hook, and the chain will be made of sufficiently short links to permit the desired adjustment by hooking one or another link over the hook T. Supposing this construction to be used without the lock of Figs. 1, 2 and 3, the chain may be attached at its lower end to an arm U extending upward from the band which clamps the hose on to the coupler; or to a lug such as E where the coupler has one.

I prefer to provide also in connection with each of the arrangements shown, a chain V′ or similar supporting device which will be either permanently as shown, or detachably fastened to the coupler directly, or indirectly by a connection to the lower end of the hose to support the latter in approximately the position in which it was coupled, even if a car has been separated and its coupler uncoupled. The position is shown in full lines in Fig. 4, being as slightly as practicable below the coupled position. This prevents the coupler from striking the track or any obstructions thereon and doing possibly injury to the coupler and to the track structure. While coupled, the hose supports the weight; the strain of uncoupling is supported by the chain Q; and the weight when uncoupled is supported mainly by the chain V′.

It will be understood that the arrangement of Fig. 4 carrying the chain back sufficiently to take all the strain of uncoupling, may be used in connection with the locking coupler of Fig. 1, the only difference being in the support for the upper end of the chain; and that any of the details shown in Figs. 4 and 5 may be used in connection with the arrangement shown in Figs. 1, 2 and 3, or vice versa.

Referring to Figs. 6 and 7 which show a common type of couplers for air brake hose, the arm V of each coupler is engaged with a locking flange W on the opposite coupler, and the gaskets X are pressed outward with a spring pressure. The swinging of the couplers to the upward angle shown in dotted lines in Fig. 6, effects their release, or if they do not swing so far as to entirely clear their locking flanges from the arms engaged by said flanges, they may still be separated by a longitudinal pull, the gaskets yielding sufficiently to permit the two couplers to be pressed bodily toward each other so as to release the locking engagements. With this type of couplers it will seldom be necessary to use a supporting chain such as V′ because the hose is usually short so as to support the couplers above the steam pipe couplers; and a dummy is sometimes provided to couple with the coupler at the rear of a train. The invention is particularly useful with air-brake couplers because of their extensive use on freight trains and the reluctance of the trainmen to go between the cars in breaking a freight train.

The chain may be substituted by a rod or any other connection having the desired supporting or pulling effect.

The specific construction shown in Figs. 1, 2 and 3 is not claimed herein being claimed in a division of this application (Patent No. 924,608, June 8, 1909).

What I claim is:—

1. In combination, a train hose coupler, a flexible hose to the lower end of which said coupler is attached and whose upper end is attached to a car, and which hose supports the weight of the coupler in its locked position, said coupler having a fixed locking arm adapted to engage the mating coupler in the lowered position of the hose and being automatically detachable from the mating coupler by a pull upon the hose, and a chain connected to said coupler and adapted to take at least a part of the strain of automatic uncoupling as the cars draw apart.

2. In combination, a train hose coupler, a flexible hose to the lower end of which said coupler is attached and whose upper end is attached to a car, said coupler being automatically detachable from the mating coupler by a pull upon the hose, and a chain connected to said coupler, and extending below the point of attachment of the upper end of the hose in the ordinary running position, and adapted o take at least a part of the strain of the hose in automatic uncoupling as the cars draw apart.

3. In combination, a train hose coupler, a flexible hose to the lower end of which said coupler is attached and whose upper end is attached to a car, said coupler being automatically detachable from the mating coupler by a pull upon the hose, and which hose supports the weight of the coupler in its locked position, said coupler having a fixed locking arm adapted to engage the mating coupler in the lowered position of the hose and being automatically detachable from the mating coupler by a pull upon the hose, and a chain connected to said coupler, and extending below the point of attachment of the upper end of the hose in the ordinary running position, and adapted to take at least a part of the strain of the hose in automatic uncoupling as the cars draw apart.

4. In combination, a train hose coupler, a flexible hose to the lower end of which said coupler is attached and whose upper end is attached to a car, and a chain connected to said coupler, and having its upper end extending below the point of support of the upper end of the hose and attached to the car at a point in the rear of the upper end of the hose.

5. In combination, a train hose coupler, a flexible hose to the lower end of which said coupler is attached and whose upper end is attached to a car, and which hose supports the weight of the coupler in its locked position, said coupler having a fixed locking arm adapted to engage the mating coupler in the lowered position of the hose and being automatically detachable from the mating coupler by a pull upon the hose, and a chain connected to said coupler, and having its upper end extending below the point of support of the upper end of the hose and attached to the car at a point in the rear of the upper end of the hose.

6. In combination, a train hose coupler, a flexible hose to the lower end of which said coupler is attached and whose upper end is attached to a car, and which hose supports the weight of the coupler in its locked position, said coupler having a fixed locking arm adapted to engage a mating coupler by a downward swinging movement of the outer ends of the couplers and their fixed locking arms, and adapted to be swung upward and to be automatically detached from the mating coupler by the pulling of the hose taut when the cars separate, and a chain connected to the coupler and adapted to take at least a part of the strain of the swinging of the coupler upward and the automatic uncoupling of it as the cars draw apart.

7. In combination, a gravity hose coupler B having at its side a forwardly projecting fixed locking arm adapted to engage the mating coupler by a downward swinging movement of its outer end, a flexible hose A to the lower end of which said coupler is attached and whose upper end is attached to a car and which supports the weight of the coupler in its locked position, said coupler adapted to have the outer end of its locking arm swung up and to be automatically detached from the mating coupler by the pulling of the hose taut when the cars separate, and a chain Q connected to said coupler and adapted to take the strain of the swinging of the coupler arm upward and the automatic uncoupling of it as the cars draw apart.

In witness whereof, I have hereunto signed my name in the presence of two subscribing witnesses.

EDWARD E. GOLD.

Witnesses:
Domingo A. Usina,
Theodore T. Snell.